(12) United States Patent
Flores

(10) Patent No.: US 8,464,990 B2
(45) Date of Patent: Jun. 18, 2013

(54) POLE MOUNTED ROTATION PLATFORM AND WIND POWER GENERATOR

(75) Inventor: Juan Esteban Flores, Owasso, OK (US)

(73) Assignee: Idea Labs, Inc., Owasso, OK (US)

( * ) Notice: Subject to any disclaimer, the term of this patent is extended or adjusted under 35 U.S.C. 154(b) by 333 days.

(21) Appl. No.: 12/893,632

(22) Filed: Sep. 29, 2010

(65) Prior Publication Data

US 2011/0107684 A1    May 12, 2011

Related U.S. Application Data

(60) Provisional application No. 61/247,788, filed on Oct. 1, 2009.

(51) Int. Cl.
F21V 35/00 (2006.01)

(52) U.S. Cl.
USPC ......... 248/218.4; 248/178.1; 290/44; 290/55; 415/4.2

(58) Field of Classification Search
CPC ............ F03D 3/065; F03D 11/04; F03D 11/00
USPC .............. 248/178.1, 544, 545, 511, 514, 534, 248/218.4, 219.1, 219.3, 219.2, 227.3, 349.1; 211/163, 85.1, 131.1; 290/44, 55; 415/4.2, 415/4.3
See application file for complete search history.

(56) References Cited

U.S. PATENT DOCUMENTS

| | | | |
|---|---|---|---|
| 2,722,195 A | 11/1955 | Rockafeller | |
| 2,761,643 A | 9/1956 | Ward | |
| 3,229,376 A * | 1/1966 | Wilcox | 33/324 |
| 3,288,358 A * | 11/1966 | Coles | 416/110 |
| 3,920,354 A | 11/1975 | Decker | |
| 4,075,500 A | 2/1978 | Oman et al. | |
| 4,684,817 A | 8/1987 | Goldwater | |
| 4,692,631 A | 9/1987 | Dahl | |
| 5,121,307 A | 6/1992 | Moore | |
| 5,419,683 A | 5/1995 | Peace | |
| 6,249,058 B1 * | 6/2001 | Rea | 290/55 |
| 6,926,491 B2 | 8/2005 | Migler | |
| 7,218,011 B2 | 5/2007 | Hiel et al. | |
| 7,220,104 B2 * | 5/2007 | Zheng et al. | 416/145 |
| 7,364,406 B2 | 4/2008 | Kinkaid | |
| 8,123,484 B2 * | 2/2012 | Choi et al. | 416/145 |
| 2002/0079705 A1 | 6/2002 | Fowler | |
| 2007/0258806 A1 | 11/2007 | Hart | |
| 2008/0169652 A1 | 7/2008 | Green | |
| 2009/0015017 A1 | 1/2009 | Rashidi | |
| 2009/0140528 A1 | 6/2009 | Ireland | |
| 2009/0224606 A1 * | 9/2009 | Gandy | 307/69 |

FOREIGN PATENT DOCUMENTS

GB    2449102    10/2007
WO    109784    9/2008

* cited by examiner

*Primary Examiner* — Anita M King
(74) *Attorney, Agent, or Firm* — Head, Johnson & Kachigian, P.C.

(57) ABSTRACT

A pole mounted rotation platform and wind power generator that is secured to an existing structure, which may or may not be vertical, to augment an existing power grid. The pole mounted rotation platform and wind power generator includes a wind sail assembly and a platform capable of rotating about the existing structure. The pole mounted rotation platform and wind power generator may be assembled, secured, leveled and aligned to the existing structure as component parts and in such a manner that any existing equipment on the existing structure does not need to be repositioned or relocated. During usage, the wind sail assembly rotates about the existing structure via the rotation platform, the resulting rotational energy is converted to electrical power, and the electrical power is output to a suitable power-using, -storing or -converting system.

29 Claims, 11 Drawing Sheets

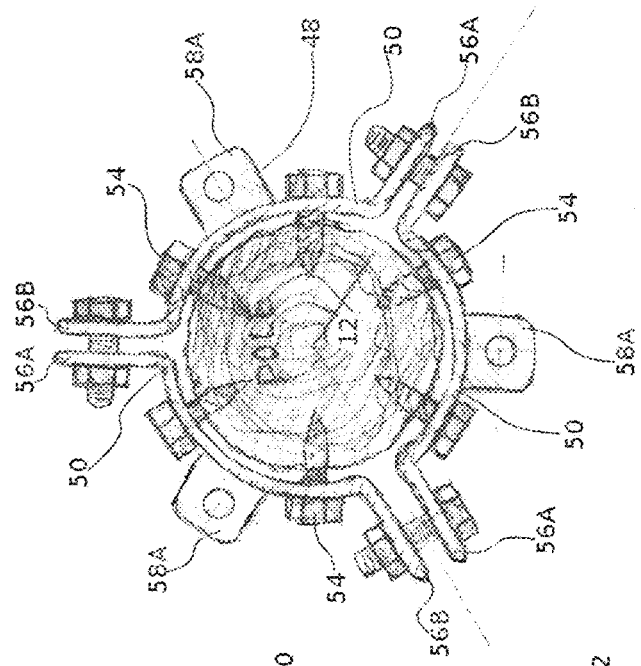
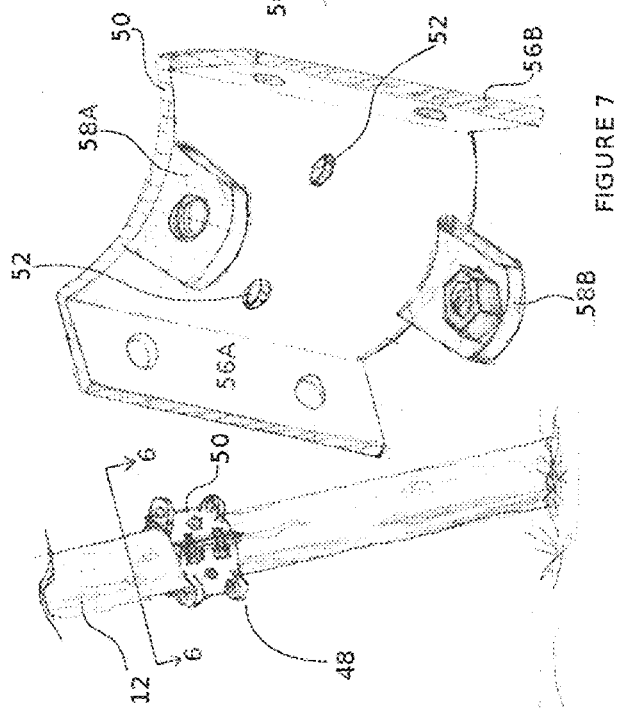

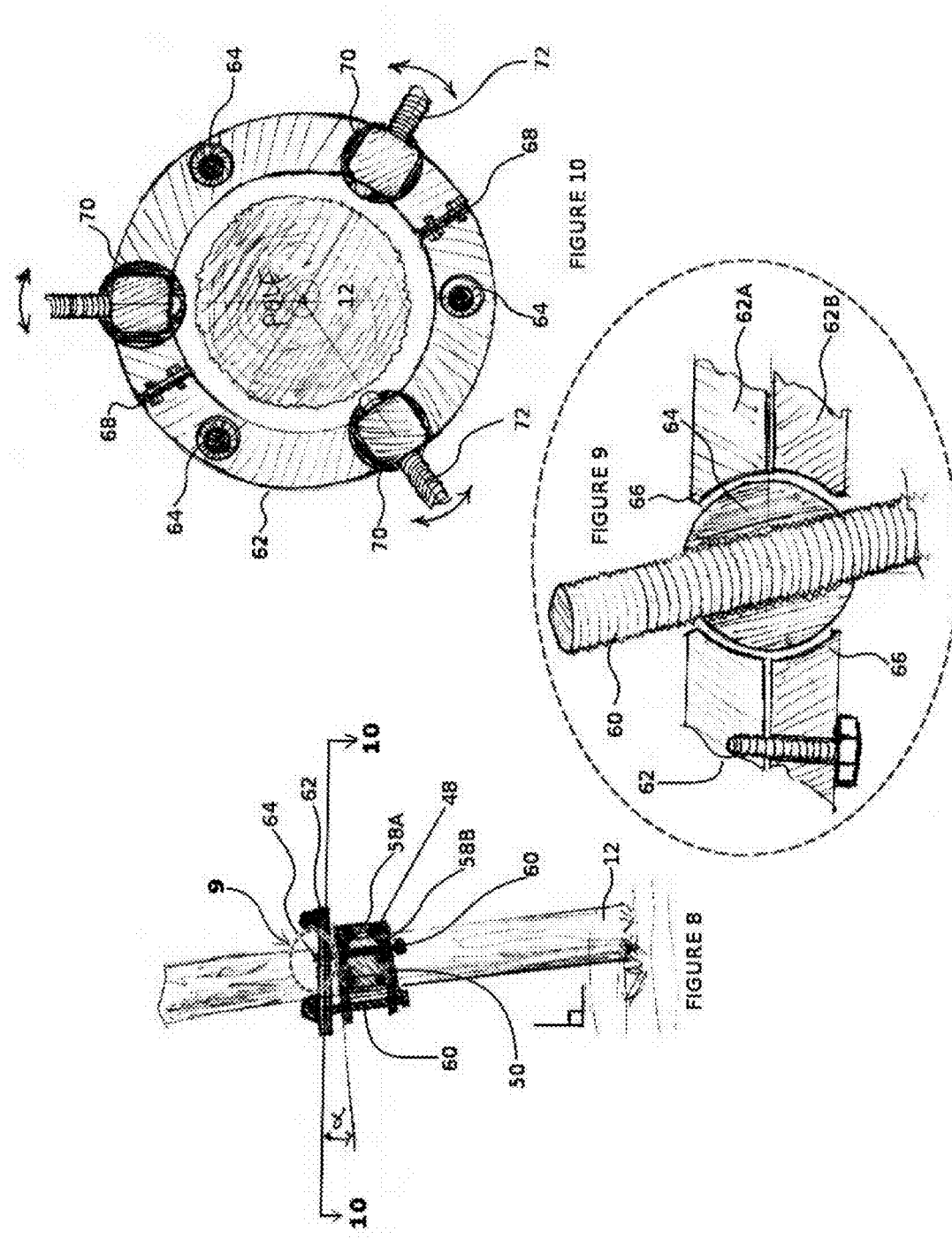

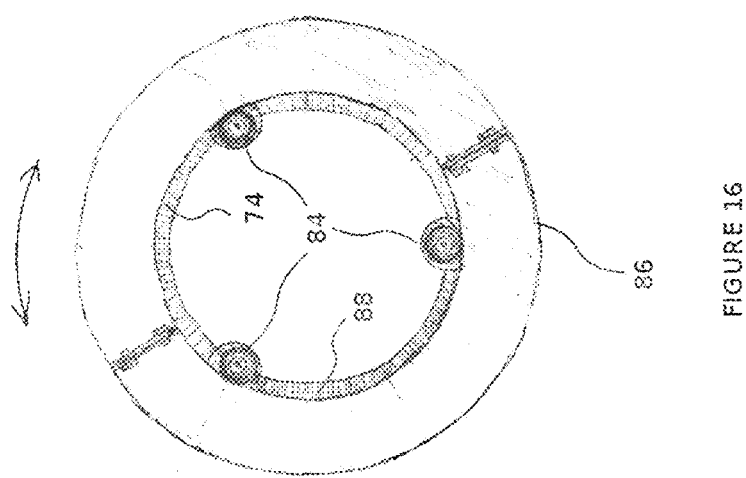
FIGURE 16
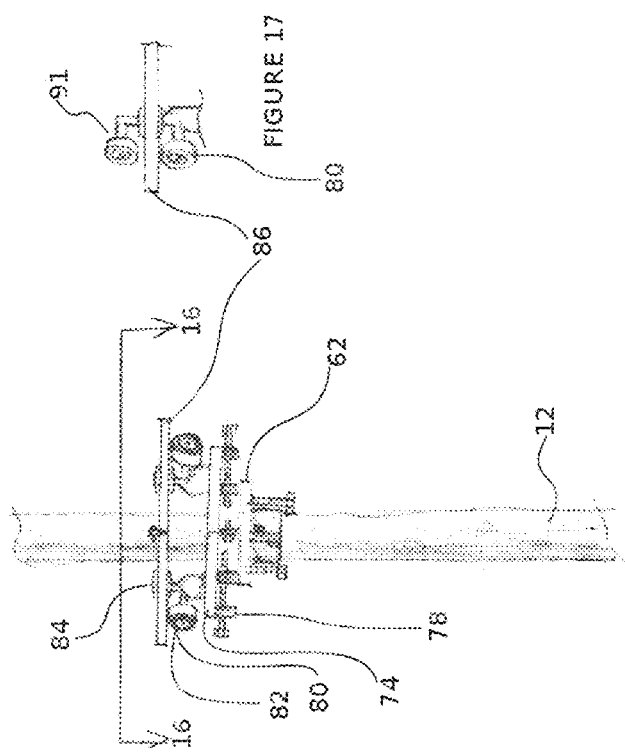
FIGURE 17
FIGURE 15

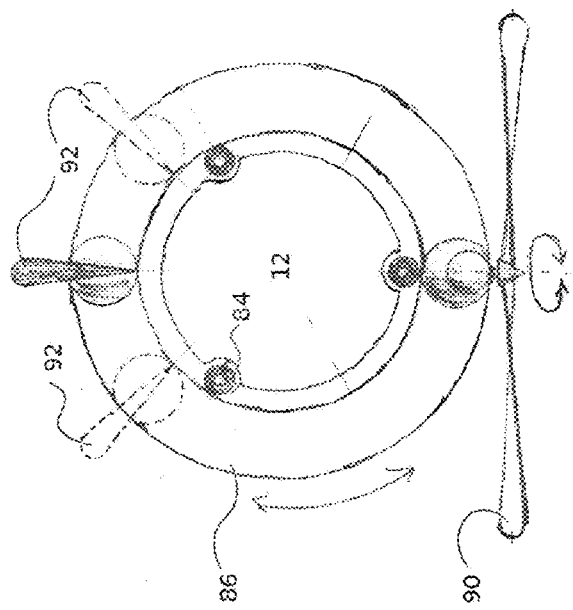
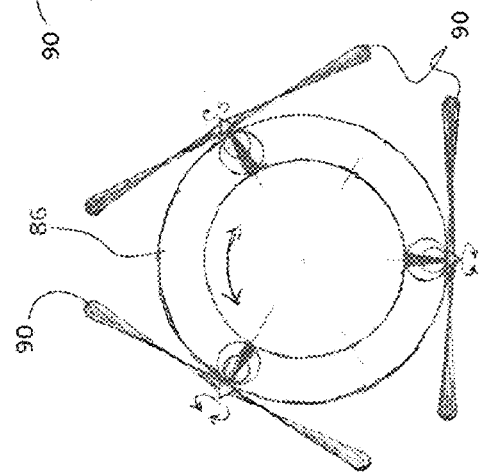
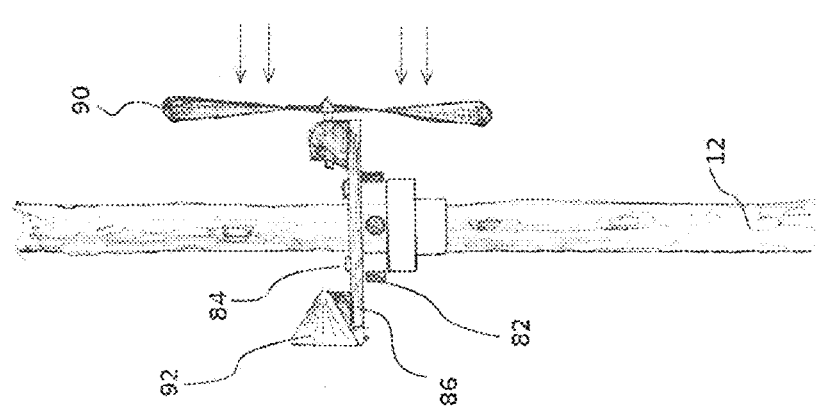

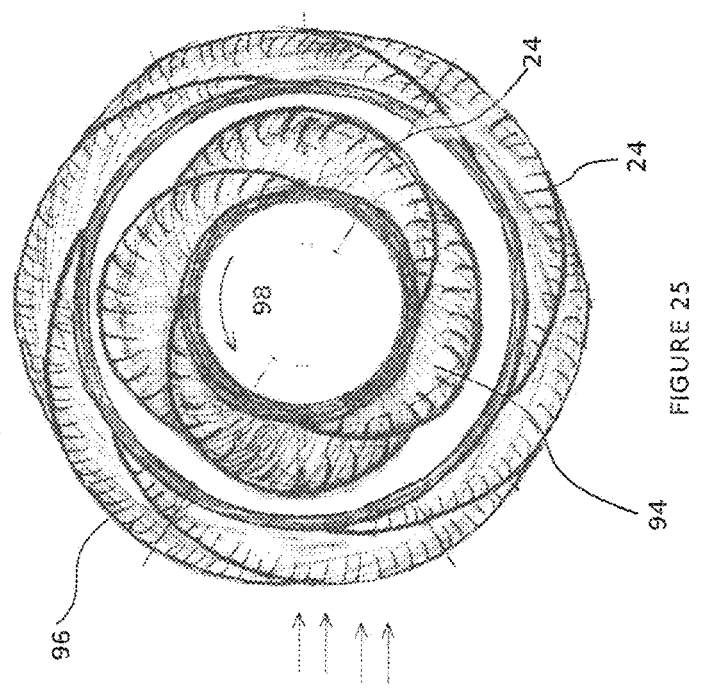
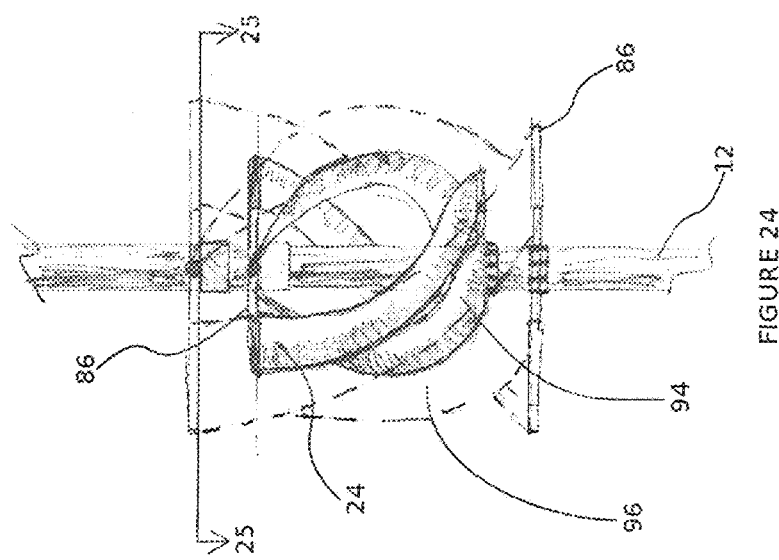

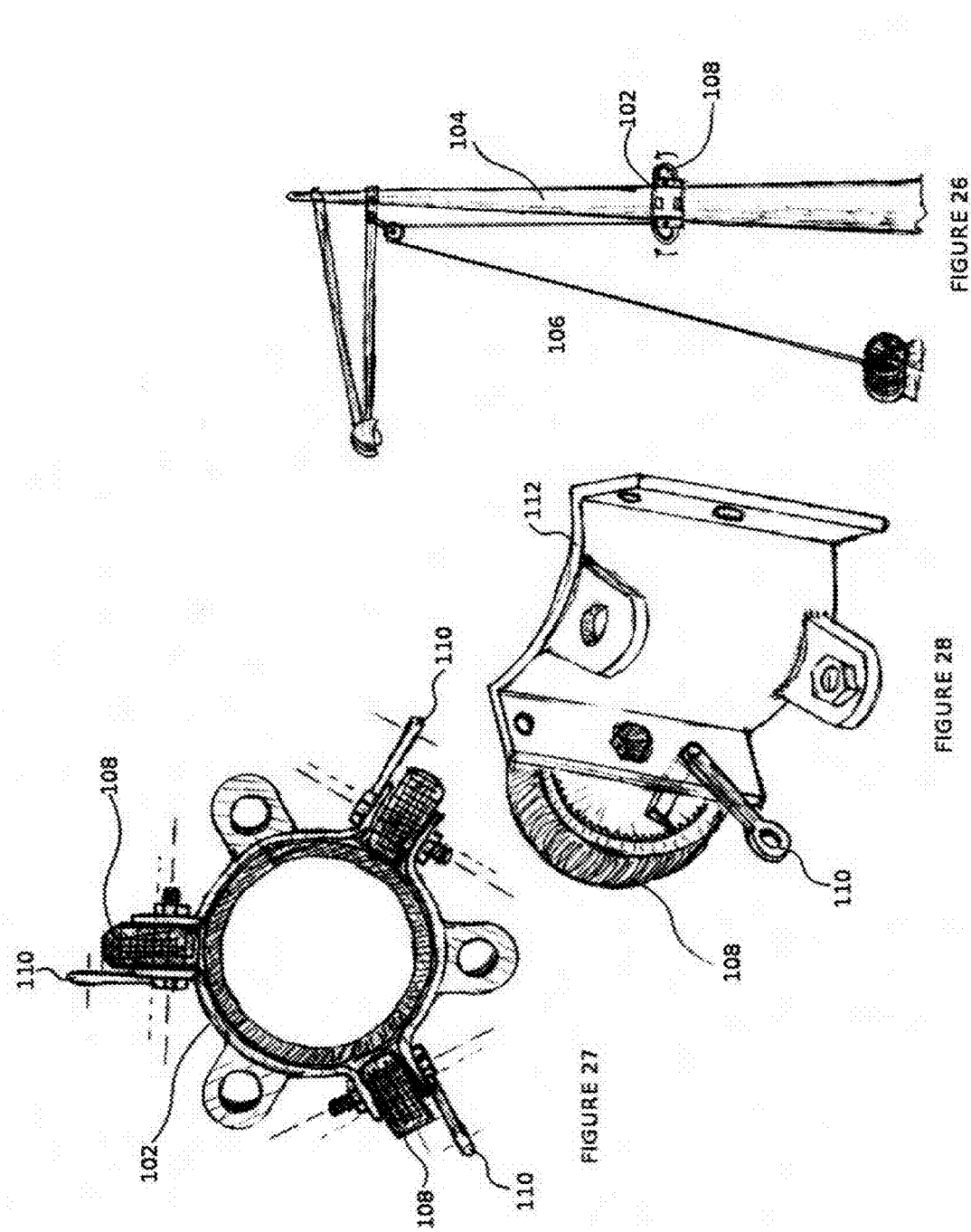

POLE MOUNTED ROTATION PLATFORM AND WIND POWER GENERATOR

CROSS-REFERENCE TO RELATED APPLICATIONS

This application claims priority to U.S. Provisional Application Ser. No. 61/247,788, filed Oct. 1, 2009, which is incorporated herein by reference.

BACKGROUND OF THE INVENTION

1. Field of the Invention

This invention relates generally to a pole mounted rotation platform and wind power generator, and more particularly to a pole mounted rotation platform and wind power generator capable of being mounted to an existing structure that may or may not be substantially, vertically oriented.

2. Description of the Related Art

Wind is a source of clean, renewable energy. Utilization of wind energy reserves the earth's fossil fuels (e.g., coal, natural gas and oil) and alleviates the additional environmental impacts associated with burning fossil fuels. Wind, as a clean, efficient and abundant, never-ending resource, generates clean energy using the most up-to-date technologies available. Today, wind energy is the fastest-growing renewable energy resource in the world. Wind currently only produces a small percentage of our nation's electricity; however during the past twenty (20) years, the cost of wind energy has dropped dramatically, making it competitive with other energy sources.

Wind is air in motion caused by the uneven heating of the earth's surface by the sun. The earth's surface is comprised of land and water, which absorb the sun's heat at different rates. During the day, the air above land heats up more readily than the air over water. The warm air over land heats, expands and rises, causing the heavier, cooler air to rush in and take its place, creating winds. At night, the winds are reversed because the air cools more rapidly over land than over water.

Since ancient times, people have harnessed the winds energy. Throughout history, societies have used wind to sail ships and have built windmills to grind wheat, corn and other grains, to pump water and to cut wood at sawmills. As late as the 1920's, Americans began using small windmills to generate electricity in rural areas without electric service. When power lines began to transport electricity to rural areas in the 1930's, local windmills were less frequently used.

The oil shortages of the 1970's changed the energy picture for the nation and the world by creating an interest in alternative energy sources, such as wind, solar, geothermal and other alternative energy sources. In the 1990's, a renewed interest in alternative energy sources came from a concern for the environment in response to scientific studies indicating potential changes to the global climate if the use of fossil fuels continued to increase. Wind is a clean, renewable fuel and wind farms produce no air or water pollution compared to refineries, because no fuel is burned. Growing concern about emissions from fossil fuels, increased government support, and higher costs for fossil fuels have helped wind power capacity in the United States grow substantially over the last ten (10) years.

Wind turbines typically capture the wind's energy using blades, which are mounted on a rotor, to generate electricity. When the wind blows, a pocket of low-pressure air forms on the downwind side of the blade; this low-pressure air pocket then pulls the blade toward it, resulting in lift and causing the rotor to turn. Since the force of the lift is much stronger than the force of the drag, the combination of lift and drag causes the rotor to spin like a propeller. The spinning rotor is connected to a generator to make electricity.

There are two main types of wind turbines used today based on the direction of the rotating shaft or axis: horizontal-axis wind turbines and vertical-axis wind turbines. The size of wind turbines varied from small turbines having a capacity of less than 100 kilowatts to large commercial sized turbines having a capacity of around five (5) megawatts. Larger turbines are often grouped together into wind farms that provide power to the electrical grid.

Most wind turbines being used today are the horizontal-axis wind turbines, typically having two or three airfoil blades. Horizontal-axis wind turbines generally harness winds at 100 feet (30 meters) or more above ground. Vertical-axis wind machines have blades that go from top to bottom, with the most common type being the Darrieus wind turbine. Vertical-axis wind turbines typically stand 100 feet tall and 50 feet wide. The Wind Amplified Rotor Platform ("WARP") is a different type of wind system that does not use large blades. Each module of the WARP has a pair of small, high capacity turbines mounted to concave wind amplifier module channel surfaces. The concave surfaces channel wind toward the turbines, amplifying wind speeds.

Further, most-vertical axis wind machines feature a pivot balanced, point of rotation and assume that the existing structure is vertical and specifically adaptable to the turbine.

Most wind turbines being used today are installed in wind farms, which require huge investments, expense, and large expanses of land. Many of the known devices for harnessing the wind are cumbersome, very large, maintenance prone, expensive, or have a large impact on the environment and aesthetics of the large areas in which they are erected. Additionally, the majority of new wind power generation devices require deployment on newly built infrastructures, built outside of cities. However, cities are where the power is needed the most, so elaborate transmission systems must also be built to take advantage of these newly deployed systems, resulting in large and prohibitive implementation costs and large power losses during the transmission over large distances.

BRIEF SUMMARY OF THE INVENTION

In general, the invention relates to a pole mounted rotation platform and wind power generator designed in units that can easily be fit together into a ring-based structure, which can be constructed around an existing structure. Since the center of the ring-based structure is hollow, the pole mounted rotation platform and wind power generator can be designed in any size that accommodates the existing structure it is being mounted on, including being sufficiently sized to accommodate an area for infrastructure equipment and conduits to pass through and for personnel to crawl through for maintenance of the pole mounted rotation platform and wind power generator and maintenance of the existing structure.

The pole mounted rotation platform and wind power generator may be used to augment or replace small power needs on their own, or placed in a power grid utilizing many of the pole mounted rotation platform and wind power generators to generate large amounts of electricity utilizing the wind that normally blows through a city. Each pole mounted rotation platform and wind power generator can take advantage of the city's specific and individual wind currents, such as funneled flows in between skyscrapers, or wind flows made by traffic on highways, to name a few. Upon implementation of a series of pole mounted rotation platform and wind power generators, a large city could off load tremendous amounts of electricity generation capacity away from polluting power generation systems by creating very large city-wide managed grids.

One advantage of mounting the pole mounted rotation platform and wind power generator to an existing structure is that the city can plan the growth of the augmented power system. The city does not need to invest in large empty areas of land, or invest on large electric infrastructure projects to take the generated electricity from rural areas into the city. City planners need not spend millions of dollars to get an augmented, environmentally safe power system up and running. With the pole mounted rotation platform and wind power generator, city's can spend much smaller amounts per year and grow the wind generation grid as resources and budgets allow.

Further, cities could not only earn power revenue from each power generator, but the pole mounted rotation platform and wind power generator could include a wind sail assembly that rotates, and each vane can be outfitted with advertisements for local events, museums, or restaurants, attractions, etc. Thus, not only would the pole mounted rotation platform and wind power generator provide cheaper, clean power, it would also provide advertising revenue.

It is therefore desirable to provide a pole mounted rotation platform and wind power generator that requires very little infrastructure development and a relatively small entry cost.

It is further desirable to provide a pole mounted rotation platform and wind power generator that is flexible and scalable, yet environmentally friendly, and which can grow to meet the power demands of the future.

It is still further desirable to provide a pole mounted rotation platform and wind power generator that is economical to manufacture, market and maintain.

It is yet further desirable to provide a pole mounted rotation platform and wind power generator that can be used to generate clean electrical power at a moderate cost.

It is yet further desirable to provide a pole mounted rotation platform and wind power generator that utilizes existing structures, such as power poles, telephone poles, light posts, antennas, chimneys and towers that have the strength to withstand winds and have easy access to the city's power grid system.

It is yet further desirable to provide a pole mounted rotation platform and wind power generator that provides a small entry cost, scalable, expandable, and flexible wind generation system, which is mounted on existing structures and utilizes existing near-by city power grid access to replace or augment the power generation capacity of the city.

Other advantages and features will be apparent from the following description and from the claims.

BRIEF DESCRIPTION OF THE DRAWINGS

FIG. 5 is a perspective view of an example of a solid leveling mount assembly secured to a non-vertical existing structure in accordance with an illustrative embodiment of the pole mounted rotation platform and wind power generator disclosed herein;

FIG. 6 is a cross-sectional view along line 6-6 of the solid leveling mount assembly of the pole mounted rotation platform and wind power generator shown in FIG. 5;

FIG. 7 is a perspective view of an example of a load-bearing, leveler mount bracket in accordance with an illustrative embodiment of the pole mounted rotation platform and wind power generator disclosed herein;

FIG. 8 is a perspective view of the pole mounted rotation platform and wind power generator shown in FIG. 5 having an example of a level-centering platform;

FIG. 9 is an exploded view of area 9 of the pole mounted rotation platform and wind power generator, as shown in FIG. 8;

FIG. 10 is a cross-sectional view along line 10-10 of the pole mounted rotation platform and wind power generator shown in FIG. 8;

FIG. 12 is a cross-sectional view along line 12-12 of the pole mounted rotation platform and wind power generator shown in FIG. 11;

FIG. 15 is a perspective view of the pole mounted rotation platform and wind power generator shown in FIG. 13 having an example of a rotation plate.

FIG. 16 is a cross-sectional view along line 16-16 of the pole mounted rotation platform and wind power generator shown in FIG. 15;

FIG. 17 is a perspective view of another example of the ring bearings in accordance with an illustrative embodiment of the pole mounted rotation platform and wind power generator disclosed herein;

FIG. 18 is a side perspective view of an example of a propeller-based wind sail assembly in accordance with an illustrative embodiment of the pole mounted rotation platform and wind power generator disclosed herein;

FIG. 19 is a top plan view of an example of a propeller-based wind sail assembly having multiple tail vanes in accordance with an illustrative embodiment of the pole mounted rotation platform and wind power generator disclosed herein;

FIG. 20 is a top plan view of another example of a propeller-based wind sail assembly having triad arrangement of propellers in accordance with an illustrative embodiment of the pole mounted rotation platform and wind power generator disclosed herein;

FIG. 24 is a side, partial cutaway, perspective view of another example of a wind sail assembly in accordance with an illustrative embodiment of the pole mounted rotation platform and wind power generator disclosed herein;

FIG. 25 is a cross-sectional view along line 25-25 of the pole mounted rotation platform and wind power generator shown in FIG. 24;

FIG. 26 is a perspective view of an example of a tapered pole mount engaged with an existing tapered structure in accordance with an illustrative embodiment of the pole mounted rotation platform and wind power generator disclosed herein;

FIG. 27 is a top view of the cam assembly of the tapered pole mount of the pole mounted rotation platform and wind power generator shown in FIG. 26; and FIG. 28 is a side view of the stabilizer bracket of the taped pole mount of the pole mounted rotation platform and wind power generator shown in FIG. 26.

DETAILED DESCRIPTION OF THE INVENTION

The devices and methods discussed herein are merely illustrative of specific manners in which to make and use the invention and are not to be interpreted as limiting in scope.

While the devices and methods have been described with a certain degree of particularity, it is to be noted that many modifications may be made in the construction and the arrangement of the structural and function details disclosed herein without departing from the spirit and scope of this disclosure. It is understood that the devices and methods are not limited to the embodiments set forth herein for purposes of exemplification.

Figure 1:
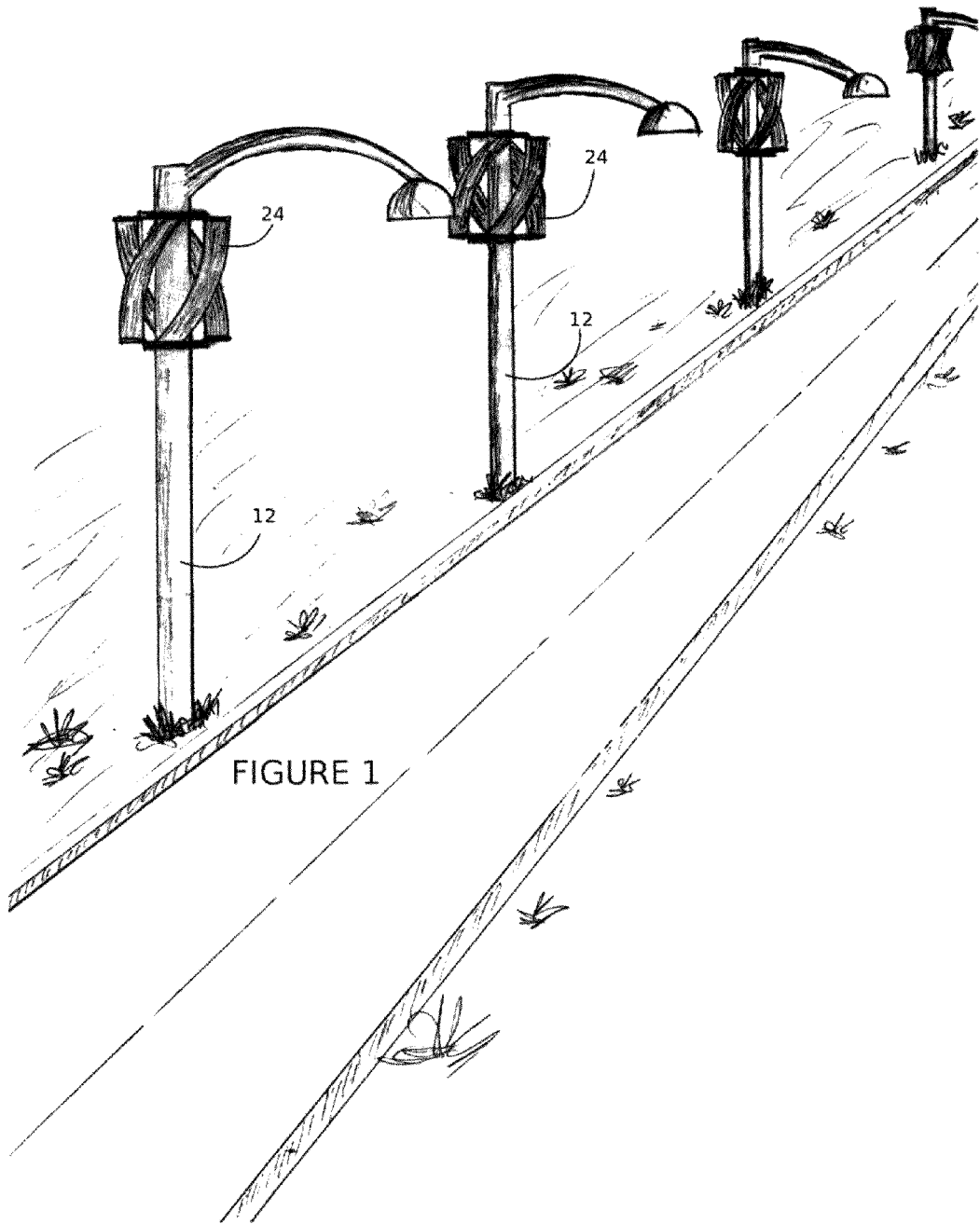
FIG. 1 is a perspective view of a local market having an example of a pole mounted rotation platform and wind power generator in accordance with an illustrative embodiment.

Referring to the figures of the drawings, wherein like numerals of reference designate like elements throughout the several views, and initially to FIG. 1, a pole mounted rotation platform and wind power generator 10 that is mountable to an existing structure 12, namely a light pole, a street light, a power transmission pole, a tower, an antenna, a building, a bridge or the like. If the pole mounted rotation platform and wind power generator 10 is secured to an existing structure 12 that is wired to an existing power grid (not shown), the pole mounted rotation platform and wind power generator 10 could be electrically connected hereto to augment the exiting power grid and thereby reduce the power grid consumption needs for the local region. Should the existing structure 12 not be wired to an existing power grid, the pole mounted rotation platform and wind power generator 10 could be electrically connected to an existing power grid. In either scenario, a control box (not shown) could also be secured to the existing structure 12 to house all necessary grid conversion electronics. Further, the wind generator could take varying forms, such as a generator shaft that rotates mechanically or an array of magnets and coils fashioned into an electrical generator, which is electrically connected to the control box (not shown), which in turn is electrically connected to the existing power grid.

The existing structure 12 acts as a "tower" to sustain the pole mounted rotation platform and wind power generator 10, which can be mounted thereto without having access to the uppermost portion of the existing structure 12. Additionally, the pole mounted rotation platform and wind power generator 10 may be assembled and secured to the existing structure 12 as component parts in such a manner that any existing equipment on the existing structure 12 does not need to be repositioned or relocated.

Figure 2:
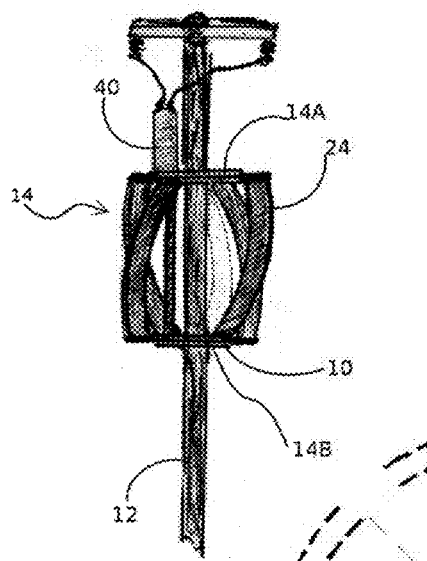
FIG. 2 is a side perspective view of an existing structure having an example of a pole mounted rotation platform and wind power generator in accordance with an illustrative embodiment.
Figure 4:
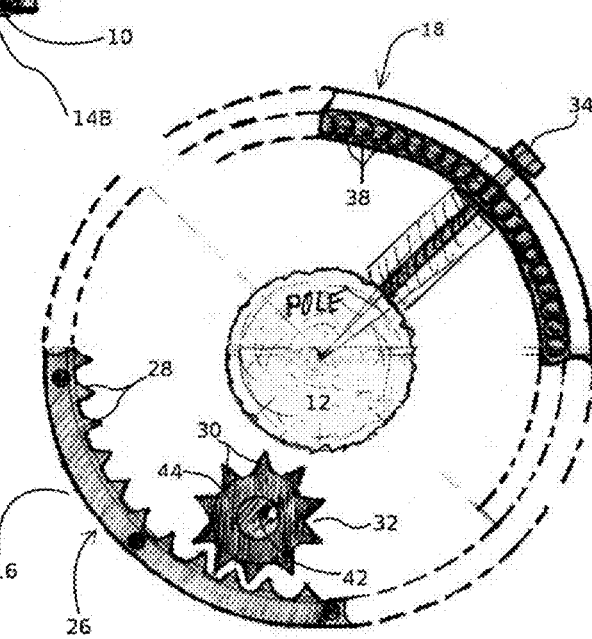
FIG. 4 is a cross-sectional view along line 4-4 of the pole mounted rotation platform and wind power generator shown in FIG. 3.
Figure 3:
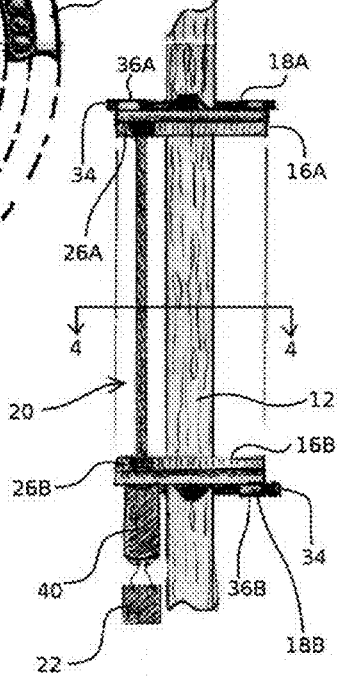
FIG. 3 is a partial cutaway view of an example of a gear ring assembly and a bearing ring assembly mounted to an existing structure in accordance with an illustrative embodiment of the pole mounted rotation platform and wind power generator disclosed herein.
Figure 13:
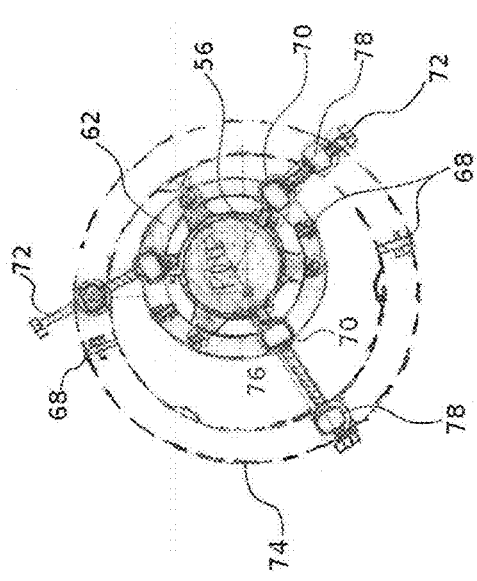
FIG. 13 is a perspective view of the pole mounted rotation platform and wind power generator shown in FIG. 11 having an example of ring bearings.

Turning now to FIGS. 2 through 4, the pole mounted rotation platform and wind power generator 10 exemplified therein includes a wind sail assembly 14, at least one gear ring assembly 16, a bearing ring assembly 18, a generator and gear shaft assembly 20 and a power converter/power grid interface 22.

The wind sail assembly 14 mounts to at least one gear ring assembly 16, such as an upper gear ring assembly 16A, and is designed in such a way that when a wind blows from any direction, the wind sail assembly 14 will easily turn the gear ring assembly 16. Alternatively and as illustrated, the wind sail assembly can mount intermediate to the upper gear ring assembly 16A and a lower gear ring assembly 16B. The wind sail assembly 14 includes at least one vane, blade, sail or other wind capturing mechanism (herein after collectively referred to as "vanes 24"). The pole mounted rotation platform and wind power generator 10 may have various designs and arrangements of vanes 24, for example, dual, tri or quad vanes, quad vanes having a single, centrally mounted electrical generator, or with each quad vane having a respective quad electrical generator, helix-shaped vane, propeller-based vanes, a single cylindrical array of substantially vertical vanes and/or at least two coaxially-aligned, cylindrical arrays of substantially vertical vanes. The vanes 24 could also be a Savonius, Darrieus, giromill, cycloturbine or helical blade arrangement. In addition, the design of the vanes 24 of the pole mounted rotation platform and wind power generator would facilitate WARP yawing on the existing structure 12. The design of the vanes 24 of the wind sail assembly 14 may differ depending on many factors, including efficiency of function, aesthetics, maintainability, advertising area, cost of materials, durability, etc. The vanes 24 may be rigid, flexible, or cloth-like. As long as the vanes 24 of the wind sail assembly 14 perform the primary job of rotating easily in at least one direction with prevailing winds, the design may be tailored to meet and address specific local market factors. An important factor to consider when designing the vanes 24 of the wind sail assembly 14 is easy maintenance of the vanes 24 themselves, and as such, the vanes 24 could be made from strong materials that withstand large wind forces, such as from tornadoes or hurricanes. The vanes 24 could also be made from pliable materials that withstand reasonable winds, but give in during stronger storm winds, to maintain the structural integrity of the existing structure 12 and/or the pole mounted rotation platform and wind power generator 10.

As can be seen from FIG. 3, the upper and the lower gear ring assemblies 16A and 16B of the pole mounted rotation platform and wind power generator 10 may each respectively include at least one gear ring 26, such as an upper and a lower gear ring 26A and 26B. The gear rings 26A and 26B may be segmented in to component pieces, which are constructed and assembled around the existing structure 12. The gear rings 26A and 26B provide a support structure to an upper 14A and a lower portion 14B of the wind sail assembly 14. Each gear ring 26A and 26B has a means of proportional transfer of mechanical power, such as radially-inward, projecting gear teeth 28 that couple to the teeth 30 on a generator gear shaft assembly 32 for transferring the rotational energy of the wind sail assembly 14 and the gear ring assembly 16 into electrical energy from a power generator or a slip gear assembly (not shown) to transfer the rotational power, whether clockwise or counter-clockwise rotation, into mechanical power.

The bearing ring assembly 18 may include an upper 36A and a lower bearing track 36B, and is secured to the existing structure 12 in a suitable manner, such as by a plurality of adjustable screw-in brackets and bolts 34 radially secured about the outer circumference of the pole or existing structure 12, but may differ in material and/or design depending on the existing structure and its construction material, such as wood, steel, concrete, etc. The bearing tracks 36A and 36B of the bearing ring assembly 18 may be constructed of component pieces that fit together to form a load-bearing reduced friction ring surface that "floats" the gear ring assembly 16. Each of the bearing tracks 36A and 36B includes the load-bearing, reduced friction ring, e.g., a plurality of ball bearings 38 that are made part of the bearing ring assembly 18 as exemplified in FIG. 4. The load-bearing, reduced friction ring provides for easy rotation of the wind sail assembly 14 (and as friction free as possible) around the pole or other existing structure 12. The bearing ring assembly 18 also provides a means for mounting (or housing) a power generator 40, which can be mounted to either the upper bearing track 36A or the lower bearing track 36B. Once the bearing ring assembly 18 is assembled and mounted to the existing structure 12, the upper bearing track 36A has the ball bearings 38 facing downward and the lower bearing track 36B has the ball bearings 38 facing upward. The gear rings 26A and 26B of the gear ring assembly 16 are made to float on the bearing tracks 36A and 36B of the bearing ring assembly 18, and the wind sail assembly 14 is assembled onto the gear rings 26A and 26B.

The power generator 40 of the pole mounted rotation platform and wind power generator 10 is part of the generator gear shaft assembly 32 that converts rotation of the gear ring assembly 16 into electricity. It will be appreciated that the power generator 40 may take the form of a water pump or other useful rotational power transfer device. The power generator 40 may generate direct current or alternating current, depending on the needs of the user and/or the local market. The power generator 40 may be custom built around the gear ring 16 and bearing ring assemblies, such as by providing coil and magnet housings within the gear ring 16 and the bearing ring assemblies 18, or it may be a discrete device that attaches to the existing structure 12, in which case the power generator 40 would be coupled to the upper 18A and/or the lower 18B bearing ring assembly.

The power generator 40 is coupled to a generator shaft 42 of the generator gear shaft assembly 32, which provides converting rotational mechanical power from the gear ring assembly 16 as it rotates with the wind. For example, the gear shaft assembly 16 includes the substantially vertical generator shaft 42, which is substantially parallel with the vanes 24 of the wind sail assembly 14. The generator shaft 42 is coaxially aligned with and coupled to a generator gear 44, which in turn is coupled to at least one of the gear rings 26 of the gear ring assembly 16. The generator gear 44 is a matching gear with a gear ratio that is calculated to provide maximum torque with a predicted and designed workload, and the gear ratio calculation should take into consideration minimum wind requirements versus desired power output. Further, the generator gear 44 may be a slip gear in order to capture and convert all rotational mechanical power from the gear ring assembly 16 as it rotates in the wind.

The power generator 40 is designed to output electricity produced by transfer of rotational power to various power-using, power-storing, and/or power-converting systems, such as by either feeding the power output directly into the city's power grid (if the output is compatible) or feeding directly into the power converter/power grid interface 22 that converts the generated power into power that is compatible with the power grid. The power converter/power grid interface 22 can vary depending on end user needs; for example, it could convert the output to 120 volts AC for direct home use, or 12 volts DC for hybrid automotive recharging. In addition, the power converter/power grid interface 22 could covert the output to a battery or other power storage device.

The power converter/power grid interface 22 may include a circuit box (not shown) that provides command and control options so the city may, for example, turn power generation on and off, or so the city may monitor power generation for this particular generator, or for the entire power grid. Outfitted with antenna powered digital radio module (similar to a car turnpike pass device), each power converter/power grid interface 22 can transfer usage, efficiency, and maintenance data to a passing maintenance vehicle outfitted with the matching digital communications equipment. In this way maintenance and statistics on running efficiency can easily be kept. Additionally the power converter/power grid interface 22 could transfer information via the grid power lines themselves, nearby phone lines, DSL lines, or via satellite if necessary.

In addition, on hot summer days when the air in the city is hot and stagnant, the wind generators 10 could be powered in reverse to use the power generators 40 as motors. In this way, the array of pole mounted rotation platform and wind power generators 40 around would become a grid of wind movers moving stagnant air around, stirring foggy air or evacuating smoke in the city after fires, etc. Each unit could be programmed via digital radio to act as a motor or as a generator. Moreover, during inclement weather, such as high winds, the motors could be used to slow down the rotation of the vanes 24 of the pole mounted rotation platform and wind power generator 10.

Referring now to FIGS. 5 through 7, the pole mounted rotation platform 10 may be leveled and/or aligned in the event the existing structure 12 is not substantially vertical oriented. As exemplified in FIGS. 5 through 7, the pole mounted rotation platform 10 includes a solid leveling mount assembly 48 having a plurality of load bearing leveler mount brackets 50. Each of the load bearing leveler mount brackets 50 includes a plurality of support apertures 52 though which a mounting screw 54 or the like may be inserted in order to affix the brackets 50 to the existing structure 12. Further, each of the brackets 50 includes opposing flared side sections 56A and 56B having a flared angle and an upper and a lower protruding threaded level adjuster 58A and 58B.

As can be seen in FIGS. 8 and 9, level adjusting screws 60 are threadably engaged in the protruding level adjusters 58 and engaged with a level-centering platform 62 via threaded gimbal mounts 64 therein. It will be appreciated that the level-centering platform 62 may be "self-leveling" and "self-balancing" using suitable pneumatics, hydraulics and/or electronics in order to fully automate and standardize the level-centering platform 62. The level-centering platform 62 may be constructed of an upper 62A and a lower 62B level-centering platform plate, each having a series of axial bores 66 forming annular pockets, with the gimbal mounts 64 being rotatably displaced therein. Additionally as discussed infra, the level-centering platform 62 may be constructed as constituent segments and joined about the existing structure 12 at a splice joint 68, as shown in FIG. 10. The level-centering platform 62 and the brackets 50 provide a mechanism that allows for quick leveling of the pole mounted rotation platform 10. By adjusting the threaded level of the adjusting screws 60, the horizontal angle of the level centering platform 62 of the pole mounted rotation platform 10 may be adjusted in order to compensate for a non-vertical existing structure 12. Since existing structures are often not vertical, alignment of the level-centering platform 62 requires off-center alignment relative to the existing structure 12.

Figure 11:
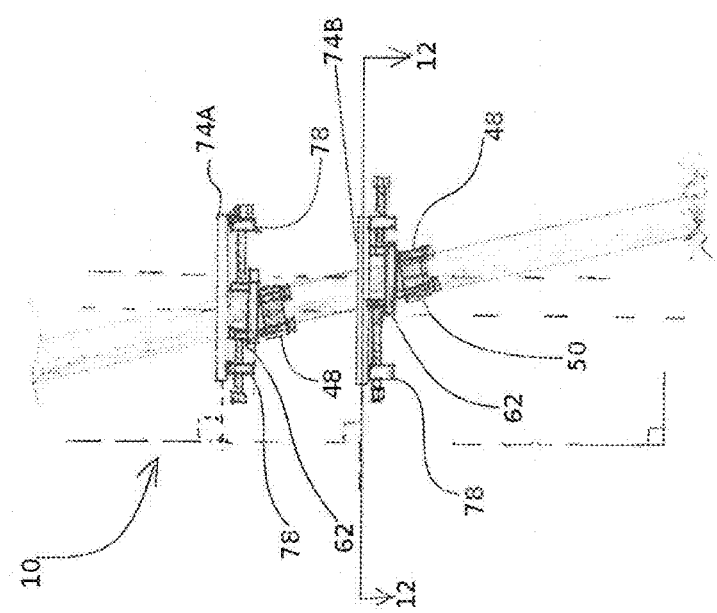
FIG. 11 is a perspective view of the pole mounted rotation platform and wind power generator shown in FIG. 8 having an example of a rotation bearing platform.
Figure 14:
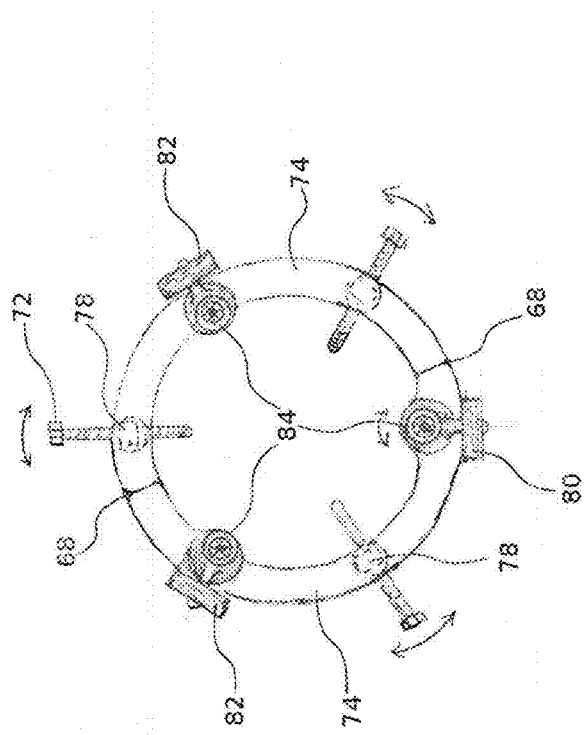
FIG. 14 is a cross-sectional view along line 14-14 of the pole mounted rotation platform and wind power generator shown in FIG. 13.
Figure 13:
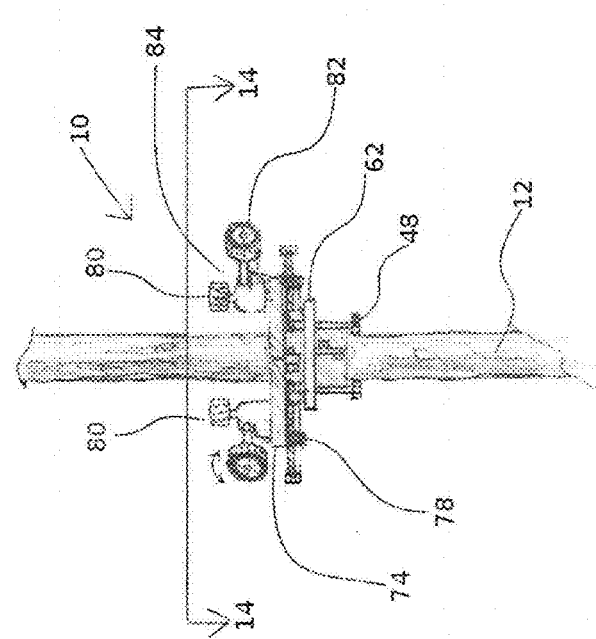

In addition, a series of swivel-center adjustment joints 70 are provided in the level-centering platform 62 to allow for quick centering of the pole mounted rotation platform 10 relative to the existing structure 12. Alignment bolts 72 are threadably engaged with the swivel-center adjustment joints 70 in the level-centering platform 62 and in a rotation bearing platform 74 respectively, and adjustment of such provides relative vertical alignment of the rotation bearing platform 74, as shown in FIGS. 11 and 12. The pole mounted rotation platform 10 allows for co-alignment of the upper and the lower rotation bearing platforms 74A and 74B, as illustrated in FIG. 11. The pole mounted rotation platform 10 also allows for centering about the existing structure 12 so that existing/new utility equipment and conduits can pass through the clearance 76 and/or so that utility personnel can gain unhindered access the upper portions of the existing structure 12 for maintenance and other operations. Furthermore, one or more rotation bearing platforms 74 may be needed on the existing structure 12 with leveling relative to the horizon and with relative vertical and horizontal alignment. For example, the pole mounted rotation platform 10 may utilize a pair of parallel, vertically aligned rotation bearing platforms 74A and 74B having the swivel-center adjustment joints 78 located on undersides thereof.

As illustrated in FIGS. 13 through 16, the upper side of the rotation bearing platform 74 may include a series of rubber of pneumatic ring bearings 80 located thereon. Each of the ring bearings 80 may include a horizontally rotating bearing 84 and a vertically rotating bearing 82. A rotation plate 86 floats on the vertically rotating bearings 82 and is guided around the existing structure 12 by the horizontally rotating bearings 84. For example, the horizontally rotating bearings 84 may traverse a groove or face 88 on an inner radial edge of the rotation plate 86. The rotation of the rotation plate 86 drives the horizontally 84 and vertically 82 rotating bearings, which in turn drive the power generator 40 via a suitable power transfer mechanism, such as having a series of teeth in the groove 88 on the inner radial edge of the rotation plate 86 driving the generator gear shaft assembly 32. An upper vertically rotating bearing 91 may be provided to prevent the rotation platform 86 from being lifted during strong winds, as shown in FIG. 17.

Referring now to FIGS. 18 through 20 illustrating various design examples of the wind sail assembly 14 that may be utilized with the pole mounted rotation platform 10 disclosed herein. FIGS. 18 through 20 illustrate the wind sail assembly 14 of the pole mounted rotation platform 10 having at least one propeller 90. When a single propeller 90 is utilized, the pole mounted rotation platform 10 may further include at least one directional tail vane 92 attached to the rotation platform 86, which serves to point the propeller 90 into the wind utilizing the rotation platform 86 to turn about the existing structure 12. When a plurality of propellers 90 is utilized, the pole mounted rotation platform 10 allows for turbulent air currents by allowing the rotation platform 86 to adjust with small or direction-less gusts. The propellers 90 may be in a triad configuration, as exemplified in FIG. 20, wherein each propeller 90 generates power with a clockwise and/or counter-clockwise rotation. In addition, the rotating platform 86 may also generate power during its respective rotation. Each of the propellers 90 may include feathering mechanisms and composite material construction.

Figure 22:
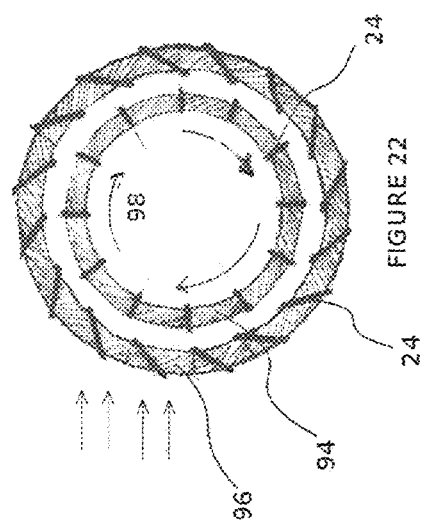
FIG. 22 is a cross-sectional view of example arrangements of the vanes of the dual fan assembly of the pole mounted rotation platform and wind power generator shown in FIG. 21.
Figure 23:
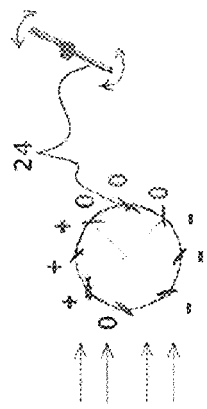
FIG. 23 is an illustration of wind's effect on rotation of a fan assembly of the pole mounted rotation platform and wind power generator disclosed herein.
Figure 21:
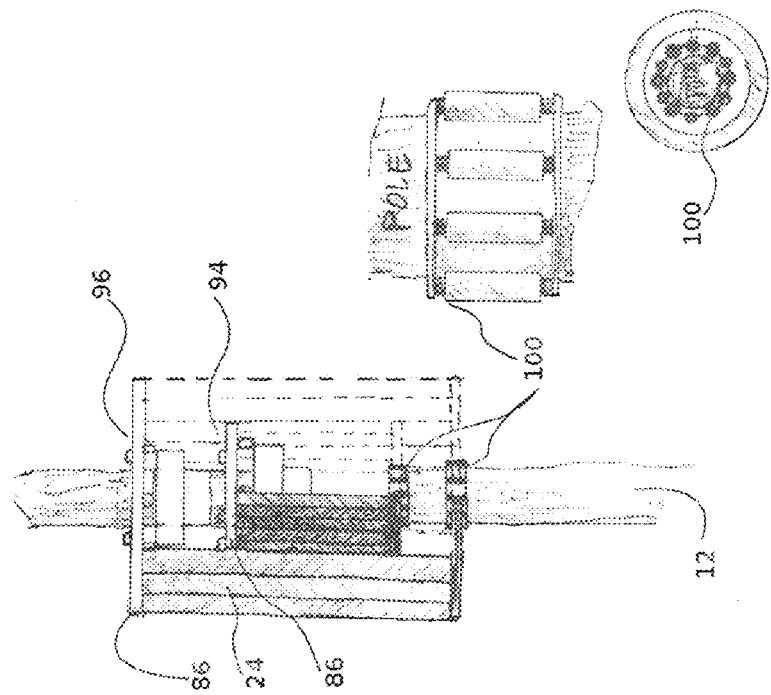
FIG. 21 is a perspective, partial cutaway view of an example of a dual fan assembly in accordance with an illustrative embodiment of the pole mounted rotation platform and wind power generator disclosed herein.

As exemplified in FIG. 21 through 25, the wind said assembly 14 of the pole mounted rotation platform 10 may take the form of a dual fan assembly built on the rotation platform 86. The dual fan assembly would include an inner fan assembly 94 and an outer fan assembly 96, each including a plurality of vanes 24. By way of example, the inner 94 and outer 96 fan assemblies may have a prime number of vanes 24, with the number of vanes of the inner fan assembly 94 being different that the number of vanes of the outer fan assembly 96. The inner 94 and the outer 96 fan assemblies may rotate independently of one another, and the outer fan assembly 96 generates power with the prevailing winds, while the inner fan assembly 94 generates power from the redirected wind from the outer fan assembly 96. The inner fan assembly 94 benefits from a vortex (represented by arrow 98) formed by the redirection and displacement of the wind by the outer fan assembly 96, thereby improving the efficiency of power generation. The vortex 98 is created regardless of the rotation of the outer fan assembly 96, or even if the outer fan assembly 96 counter-rotates. The vanes 24 of the inner 94 outer 96 fan assemblies may include variable pitch control, such as via counter-weights or motors. As illustrated in FIG. 23, typical vertical wind vanes only use one-third of the structure for positive rotation, with one-third being neutral and the remaining one-third being negative rotation (or drag) from the prevailing wind. The variable pitch control of the outer fan assembly 96 would allow for increased efficiency in capturing the prevailing wind, resulting in greater rotation of the rotation platform 86 and power generation. Also, as shown in FIG. 21, the pole mounted rotation platform 10 may include a series of vertical bearings 100 secured to the outer periphery of the existing structure 12. The vertical bearings 100 should only contact the wind sail assembly 14 during an unstable situation (e.g., high winds), whereas during normal operation, the vertical bearings 100 produce no friction. Moreover, the vertical bearings 100 could be designed to slow the rotation of the wind sail assembly 14 during high winds to protect the pole mounted rotation platform 10.

The inner 94 and/or the outer 96 fan assemblies as illustrated in FIGS. 21 and 22 may include vertically oriented and parallel aligned vanes 24, but as illustrated in FIGS. 23 and 24, they should not be so limited; the vanes 24 of the inner 94 and/or the outer 96 fan assemblies may be arched or helical and may include a partial airfoil shape.

Turning now to FIGS. 26 through 28, the pole mounted rotation platform 10 may include a rotatable cam 108 that allows rotation of a tapered pole mount 102 to be securely hoisted up and/or down an existing tapered structure 104 using a pulley and winch assembly 106. Any downward force on the tapered pole mount 102 is overcome by the cam 108 tightening on the tapered structure 104. A cam release mechanism, such as a pair of release levers 110 engaged respectively with the cam 108, allows for easy downward movement of the pole mount and the pulley and winch assembly allows for up/down hoisting. The pole mount 102 may further include a stabilizer bracket 112 capable of contacting a load-bearing leveler mount for hoisting or lowering.

While the pole mounted rotation platform disclosed herein as been discussed relative to a wind power generator, it should not be so limited. The pole mounted rotation platform may be utilized in other applications, such as rotating monitor cameras or solar tracking devices.

Whereas, the devices and methods have been described in relation to the drawings and claims, it should be understood that other and further modifications, apart from those shown or suggested herein, may be made within the spirit and scope of this invention.

What is claimed is:

1. A rotation platform capable of being leveled, attached to and centered about an existing structure, said rotation platform comprising:

a leveling mount assembly having a plurality of load bearing leveler mount brackets;

a level-centering platform adjustably secured to the leveling mount assembly, wherein a horizontal angle of the level-centering platform is capable of being adjusted in order to compensate for a non-vertical existing structure; and a rotation bearing platform coupled to the level-centering platform, wherein the rotation bearing platform has leveling relative to the horizon and/or has vertical alignment relative to the existing structure.

2. The rotation platform of claim 1 wherein each of the load bearing leveler mount brackets has a plurality of support apertures to rigidly affix the load bearing leveler mount bracket to the existing structure, and wherein each of the load bearing leveler mount brackets has opposing flared side sections having a flared angle and at least one protruding level adjuster.

3. The rotation platform of claim 2 wherein the protruding level adjuster further comprise upper and lower protruding level adjusters.

4. The rotation platform of claim 2 wherein the level-centering platform is adjustably secured to the leveling mount assembly via at least one gimbal mount.

5. The rotation platform of claim 4 wherein the level-centering platform further comprise upper and lower level-centering platform plates, each of the upper and lower level-centering platform plates having a series of axial bores forming annular pockets, and wherein the gimbal mounts are respectively rotatably displaced within the annular pockets.

6. The rotation platform of claim 1 wherein the level-centering platform is constructed of constituent segments and joined about the existing structure.

7. The rotation platform of claim 1 wherein the level-centering platform is self-leveling and/or self-centering using pneumatics, hydraulics and/or electronics.

8. The rotation platform of claim 1 further comprising a series of swivel-center adjustment joints in the level-centering platform allowing for centering of the rotation bearing platform relative to the existing structure.

9. The rotation platform of claim 1 further comprising a plurality of rotation bearing platforms, each having leveling relative to the horizon and/or having vertical alignment relative to the existing structure.

10. The rotation platform of claim 1 further comprising a rotation plate rotatably engaged with a vertically rotating bearing and a horizontally rotating bearing on an upper side of the rotation bearing platform, the rotation plate being guided around the existing structure by the horizontally rotating bearing, and wherein rotation of the rotation plate drives the horizontally and vertically rotating bearings.

11. The rotation platform of claim 10 wherein the horizontally rotating bearing traverses a groove or face on an inner radial edge of the rotation plate.

12. The rotation platform of claim 10 further comprising an upper horizontally rotating bearing to prevent the rotation plate from being lifted.

13. A rotation platform capable of being leveled and attached to an existing structure, said rotation platform comprising:

a leveling mount assembly having a plurality of load bearing leveler mount brackets;

a leveling platform adjustably secured to the leveling mount assembly, wherein a horizontal angle of the leveling platform is capable of being adjusted in order to compensate for a non-vertical existing structure; and a rotation bearing platform coupled to the leveling platform, wherein the rotation bearing platform has leveling relative to the horizon.

14. The rotation platform of claim 13 wherein each of the load bearing leveler mount brackets has a plurality of support apertures to rigidly affix the load bearing leveler mount bracket to the existing structure, and wherein each of the load bearing leveler mount brackets has opposing flared side sections having a flared angle and at least one protruding level adjuster.

15. The rotation platform of claim 13 wherein the leveling platform is adjustably secured to the leveling mount assembly via at least one gimbal mount.

16. The rotation platform of claim 15 wherein the leveling platform further comprise upper and lower leveling platform plates, each of the upper and lower leveling platform plates having a series of axial bores forming annular pockets, and wherein the gimbal mounts are respectively rotatably displaced within the annular pockets.

17. The rotation platform of claim 13 wherein the leveling platform is self-leveling using pneumatics, hydraulics and/or electronics.

18. The rotation platform of claim 13 further comprising a series of swivel-center adjustment joints in the leveling platform allowing for centering of the rotation bearing platform relative to the existing structure.

19. The rotation platform of claim 13 further comprising a plurality of rotation bearing platforms, each having leveling relative to the horizon and/or having vertical alignment relative to the existing structure.

20. The rotation platform of claim 13 further comprising a rotation plate rotatably engaged with a vertically rotating bearing and a horizontally rotating bearing on an upper side of the rotation bearing platform, the rotation plate being guided around the existing structure by the horizontally rotating bearing, and wherein rotation of the rotation plate drives the horizontally and vertically rotating bearings.

21. The rotation platform of claim 20 wherein the horizontally rotating bearing traverses a groove or face on an inner radial edge of the rotation plate.

22. A rotation platform capable of being attached to and centered about an existing structure, said rotation platform comprising:

a leveling mount assembly having a plurality of load bearing leveler mount brackets;

a centering platform adjustably secured to the leveling mount assembly;

a rotation bearing platform coupled to the centering platform, wherein the rotation bearing platform has vertical alignment relative to the existing structure; and a series of swivel-center adjustment joints in the centering platform allowing for centering of the rotation bearing platform relative to the existing structure.

23. The rotation platform of claim 22 wherein each of the load bearing leveler mount brackets has a plurality of support apertures to rigidly affix the load bearing leveler mount bracket to the existing structure, and wherein each of the load bearing leveler mount brackets has opposing flared side sections having a flared angle and at least one protruding level adjuster.

24. The rotation platform of claim 22 wherein the centering platform is adjustably secured to the leveling mount assembly via at least one gimbal mount.

25. The rotation platform of claim 24 wherein the centering platform further comprise upper and lower centering platform plates, each of the upper and lower centering platform plates having a series of axial bores forming annular pockets, and wherein the gimbal mounts are respectively rotatably displaced within the annular pockets.

26. The rotation platform of claim 22 wherein the centering platform is self-centering using pneumatics, hydraulics and/or electronics.

27. The rotation platform of claim 22 further comprising a plurality of rotation bearing platforms, each having leveling relative to the horizon and/or having vertical alignment relative to the existing structure.

28. The rotation platform of claim 22 further comprising a rotation plate rotatably engaged with a vertically rotating bearing and a horizontally rotating bearing on an upper side of the rotation bearing platform, the rotation plate being guided around the existing structure by the horizontally rotating bearing, and wherein rotation of the rotation plate drives the horizontally and vertically rotating bearings.

29. The rotation platform of claim 28 wherein the horizontally rotating bearing traverses a groove or face on an inner radial edge of the rotation plate.

* * * * *